May 28, 1940.  R. L. WAGNER  2,202,131
CIRCLE CUTTING APPARATUS
Original Filed May 28, 1937  3 Sheets-Sheet 1

INVENTOR
ROBERT L. WAGNER
BY
ATTORNEY

May 28, 1940.  R. L. WAGNER  2,202,131
CIRCLE CUTTING APPARATUS
Original Filed May 28, 1937  3 Sheets-Sheet 2
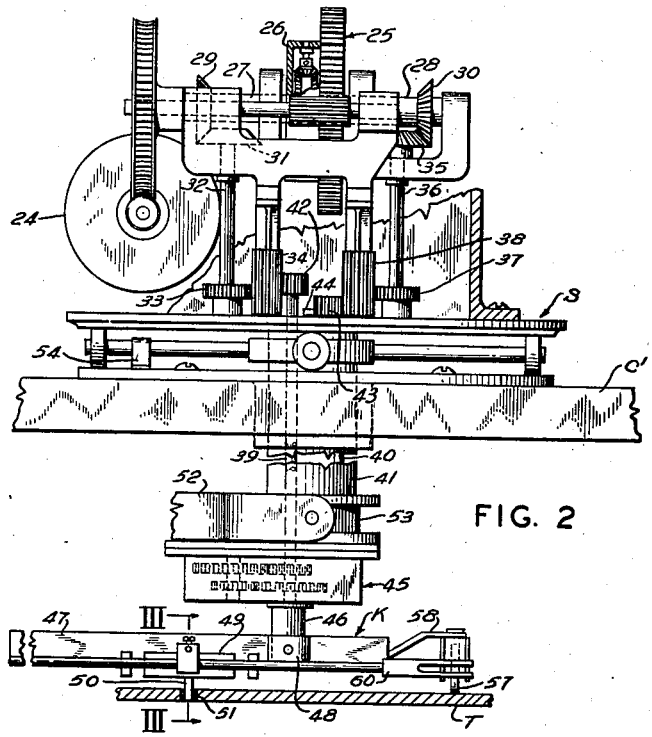
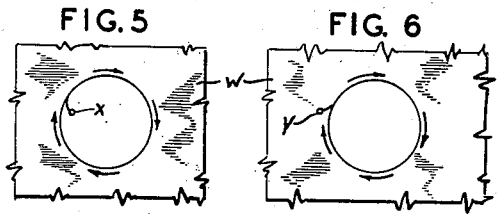
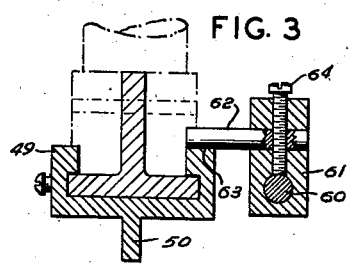
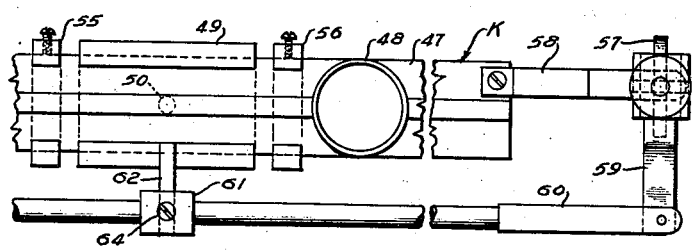
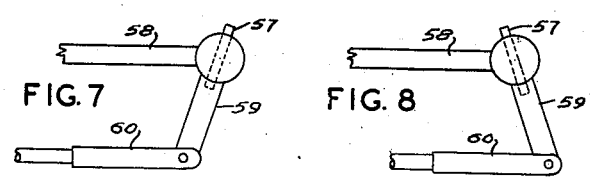
INVENTOR
ROBERT L. WAGNER
BY
ATTORNEY May 28, 1940.  R. L. WAGNER  2,202,131
CIRCLE CUTTING APPARATUS
Original Filed May 28, 1937   3 Sheets-Sheet 3
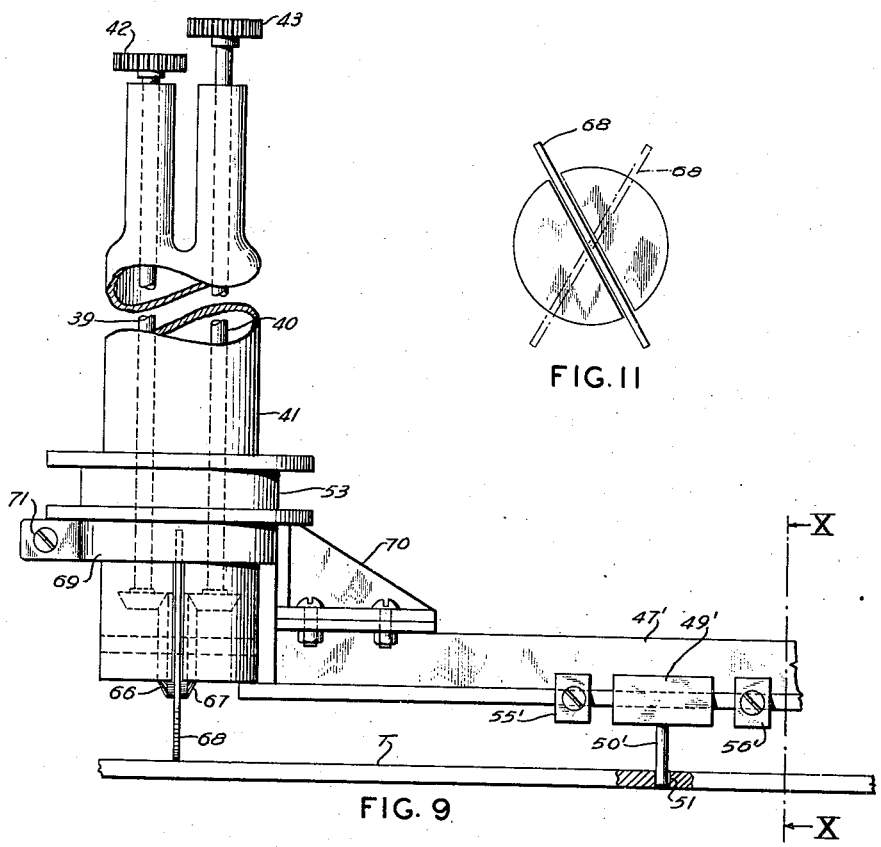
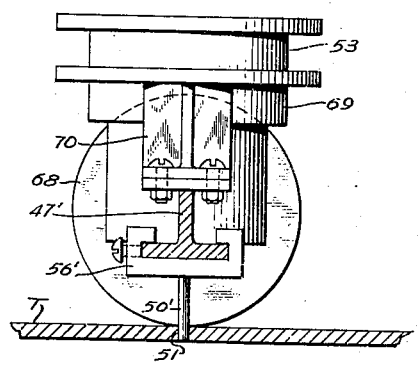
INVENTOR
ROBERT L. WAGNER Patented May 28, 1940

2,202,131

UNITED STATES PATENT OFFICE 2,202,131

CIRCLE CUTTING APPARATUS

Robert L. Wagner, Niagara Falls, N. Y., assignor, by mesne assignments, to Oxweld Acetylene Company, a corporation of West Virginia Application May 28, 1937, Serial No. 145,280
Renewed July 11, 1939

18 Claims. (Cl. 266—23)

This invention relates to the art of cutting and treating metal, and more particularly to the art of cutting circles in metal. The invention is especially useful in its application to gas cutting of metal, to which use, however, it is not limited.

A convenient apparatus for supporting and guiding a cutting element or similar tool comprises a wheeled carriage which moves forward and backward on tracks above a table, a second wheeled carriage which supports the cutting element and which moves along the first carriage on tracks extending at right angles to the direction of the first carriage movement, and a guiding element fixed to the second carriage and co-operating with a templet which is fixed to the table. Such an apparatus is disclosed in my patent, for Reproducing machine, No. 2,087,678 which was issued on July 20, 1937.

A machine of the character described reproduces the pattern of the templet which is fastened to the table when making a cut in metal. When the machine is used for cutting circles of different diameters, it is necessary to employ a different templet for each diameter of circle which is cut. If a large number of circles of different diameters are cut, the expense of providing templets for the machine is considerable.

One object of the invention, therefore, is to provide means for guiding a machine of the character described in cutting circles of different diameters without the use of templets. Another object is the provision of such means in a form which may be readily attached to and detached from a shape-cutting machine. A further object is the provision of such means in simple, durable, and inexpensive form.

The above and other objects and novel features of the invention will be apparent from the following description taken with the accompanying drawings, in which:

Fig. 2 is an enlarged broken elevation of a part of a cutting machine illustrating the application of the invention thereto;

Fig. 3 is a cross section on the line III—III of Fig. 2;

Fig. 4 is a top view of the circle cutting attachment which is illustrated in Figs. 1 and 2;

Figs. 5 and 6 are broken plan views of workpieces illustrating two methods of cutting circles therein;

Figs. 7 and 8 are broken plan views of a part of the circle cutting attachment illustrating different positions of the parts from that shown in Fig. 4;

Fig. 9 is a broken elevation of another form of circle cutting attachment constructed in accordance with the invention;

Fig. 10 is a cross section taken on the line X—X of Fig. 9; and

Fig. 11 is a semi-diagrammatic plan view illustrating two alternative positions of a part of the apparatus shown in Fig. 9.

Figure 1:
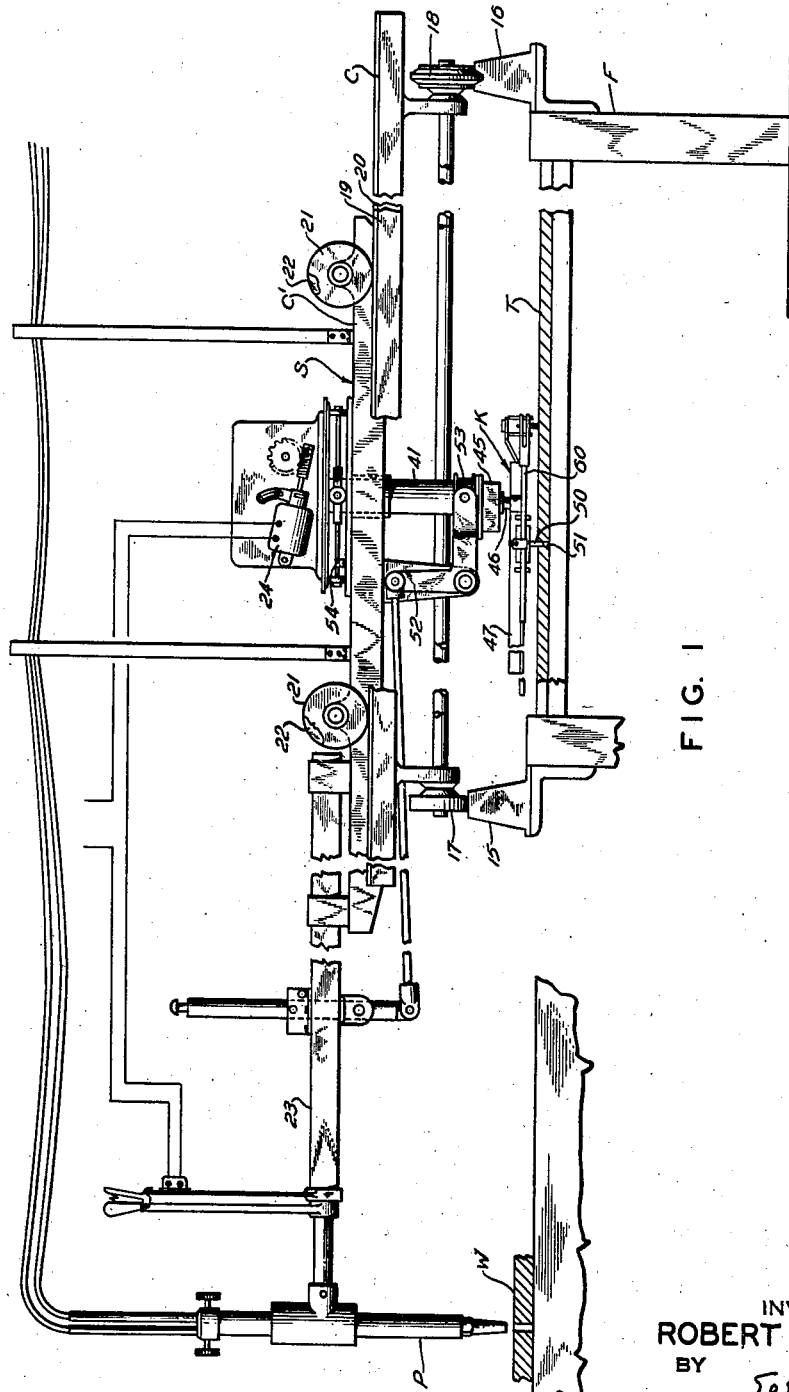
Fig. 1 is a broken side elevation of a shape cutting machine to which the invention is applied.

The invention comprises, broadly, a tool for operating on a workpiece, means for supporting the tool for universal movement in a plane, and means attached to the supporting means for moving the tool in a circular path.

In the embodiment of the invention which is shown in Figs. 1 and 2, the tool is illustrated as a blowpipe P which operates on a horizontal workpiece W. The blowpipe is supported for universal movement in a plane by supporting means S; and means K is attached to the supporting means S for moving the blowpipe P in a circular path. The supporting means S is carried by a frame F, upon which are fastened spaced parallel rails 15 and 16. The frame F also carries a horizontal table T between the rails.

The supporting means S comprises a carriage C, mounted on wheels 17 and 18 (only one pair of wheels being shown), for movement back and forth upon the rails 15 and 16. The carriage C has thereon parallel rails 19 and 20 extending transversely thereof in a direction at right angles to that of the rails 15 and 16. A second carriage C', mounted on wheels 21, 21 and 22, 22 travels back and forth on the rails 19 and 20 of the carriage C. Thus a point on the second carriage C' can be caused to follow any desired path over the table T by the combined motions of the two carriages. The blowpipe P is rigidly attached to the second carriage C' by means of an adjustable arm 23, and is therefore supported by the supporting means S for universal movement in a plane.

The second carriage has mounted thereon means for causing the carriage to follow a pattern or templet upon the table T. Thus a motor 24 drives a train of gears 25, including a differential 26 which rotates a pair of separate coaxial shafts 27 and 28 in the same direction. The shaft 27 has a bevel gear 29 thereon, and the shaft 28 has a bevel gear 30 thereon. The bevel gear 29 meshes with a bevel gear 31 mounted on a vertical shaft 32 having a spur gear 33 thereon, by means of which a vertical elongated pinion 34 is operated. The bevel gear 30 on the shaft 28 meshes with a bevel gear 35 on a shaft 36 having a spur gear 37 thereon. The spur gear 37 rotates a vertical elongated pinion 38 similar to the vertical elongated pinion 34. It will be obvious that the elongated pinions 34 and 38 turn in opposite directions. Vertical shafts 39 and 40 mounted in a vertically adjustable sleeve 41 extend below the carriage C' and have keyed to their upper ends spur gears 42 and 43, respectively, which mesh with the elongated pinions 34 and 38. When a templet is used, these vertical shafts carry traction rollers at their lower ends, and, since the shafts 39 and 40, rotate in opposite directions, it is possible to cause the traction rollers to contact the templet on either side, and by rolling thereon to guide the support S and with it the blowpipe P around the outline of the templet.

When employing the present invention, but one of the shafts is used, as the shaft 39, and the traction rollers are removed from the ends of both vertical shafts. The spur gear 43 is locked against rotation by any convenient means, as by a dog 44, and thereupon becomes inoperative. Because of the differential 26, such locking is possible, and the apparatus may be operated entirely from the other side of the differential.

A reducing gear mechanism, generally indicated at 45, is mounted on the lower end of the adjustable sleeve 41, and is connected to the lower end of the shaft 39. A shaft 46, connected to the slow speed end of the mechanism 45, projects downwardly from the reducing gear mechanism in proximity to the top of the table T. The means K for moving the blowpipe P in a circular path is attached to the lower end of the slow moving shaft 46.

In the embodiment illustrated in Figs. 1 and 2, the means K comprises a radius bar 47 fixed to the shaft 46 by means of a collar 48 rigidly attached to the radius bar. The radius bar 47 extends horizontally and at right angles to the common axis of the collar 48 and the slow moving shaft 46. The radius bar, as here illustrated, comprises a T bar having its flange below and its web extending upwardly. Preferably the radius bar extends a considerably greater distance on one side of its connection to the shaft 46 than on the other.

A slide 49 is mounted on the radius bar extending beneath its flange and embracing the ends thereof, so that it may be moved longitudinally of the bar as desired. A downwardly extending centering pin 50 is carried by the slide, being formed integrally therewith, or welded, or otherwise fastened thereto. The pin 50 is provided for pivotal engagement with a fixed socket in the table T. Such a socket may be provided merely by punching a hole 51 in or through the table top. From the foregoing, it will be obvious that, if the slide 49 is fixed on the radius rod with the pin 50 extending downwardly into the socket or hole 51 in the table top, and if the motor 24 is started, then rotation of the shaft 46 will rotate the entire supporting means S about the pin 50 with an effective radius equal to the distance between the pin 50 and the axis of the shaft 46. In consequence, the blowpipe P will follow the same path and may be caused to trace over the workpiece W a circle having a radius equal to the distance between the axis of the shaft 46 and the axis of the pin 50. Furthermore, the radius of the circle cut by the blowpipe may be varied by adjusting the position of the slide 49 on the radius bar 47.

A bell crank lever 52 operated in the manner illustrated and described in my Patent No. 2,087,678, referred to above, or in any other known or convenient manner serves to lift the radius bar and associated parts, when desired, by contact with a collar 53 on the vertically adjustable sleeve 41.

When the machine to which the invention is applied is employed for following a templet by means of traction rollers on the lower ends of the vertical shafts 39 and 40, it is necessary that the motor and train of gears turn upon the support S in order to maintain tangency between the traction rollers and the templet. If such turning is permitted when the present invention is applied to the machine, the single vertical shaft 39 will merely turn the motor and train of gears as a unit on the support and will not effect circular motion of the entire apparatus about the pin 50. Accordingly, the present invention contemplates preventing the turning of the motor and train of gears upon the support. This may be accomplished by means of a strap 54 restraining a part of the turning mechanism and fixed to the support, or by any other convenient means.

In starting the cut, it is necessary either to drill a hole in the workpiece or to cut an initial hole with the blowpipe gas. In either case, the starting of the gas cut will generally produce irregularity in a small initial area of the cut face. This is a well-known phenomenon and usually produces a rounded top edge of the hole at the start of the cut. It is accordingly desirable to start the cut away from the final circumference of the finished cut. If the result sought is to be a hole in the workpiece having sharp edges, it is desirable to start the cut inside of the final circumference (see Fig. 5). If, on the other hand, the product is to be a circular piece cut from the workpiece, it is desirable to start the cut outside of the final circumference (see Fig. 6). To this end, the slide 49 and the radius rod 47 are constructed to move freely with respect to each other. In cutting a circle, the distance between the pin 50 and the axis of the shaft 46 is set to define a longer or a shorter initial radius than that of the final circle according to whether the final product is to be a circular piece cut from a plate or a plate having a hole cut therein. The machine is then operated to decrease or increase the effective radius in order to produce a final cut having sharp edges.

In order that the radius of travel of the support and of the blowpipe may be increased or decreased by predetermined increments to that finally desired, means is provided for moving the support away from or toward the pin 50 as the cut progresses. In the embodiment illustrated in Figs. 1 to 8, inclusive, this means comprises a friction wheel 57 mounted on the radius bar. As here shown, an extension bar 58 is connected at one end to the radius bar 47 on the opposite side of the collar 48 from that on which the slide 49 is carried. A horizontal rod 59 is swiveled by a vertical pivot at one of its ends to the other end of extension bar 58. The friction wheel 57 is journaled in vertical position to this end of the horizontal rod 59, and its axle turns angularly with the horizontal rod. A second rod 60 is pivoted to the other end of the horizontal rod 59 and extends substantially parallel to the radius bar 47. The second rod 60 extends through an adjustable clamp 61 which is fixed to the slide 49 as by a member 62 welded or otherwise attached thereto as at 63. The second rod 60 slides through the adjustable clamp 61 and may be fixed therein in any desired position by means of a set screw 64. When the second rod 60 is fastened to the slide 49, movement of the slide along the radius bar 47 will, therefore, change the angularity of the friction wheel 57 with respect to the radius bar.

If it is desired to produce a plate or the like having a sharp-edged hole therein, the plate is flame-cut by the blowpipe, as illustrated in Fig. 5. The blowpipe is moved from the starting point X in clockwise direction along the line shown. In order that the blowpipe may follow this path, it is evident that the support S must also follow an identical path. Accordingly, the pin 50 on the slide 49 is inserted in the socket or hole 51 in the table T and the axis of the shaft 46 is positioned from the pin a distance equal to the radius of the circle which is to be cut. The stop 55 is now moved into contact with the end of the slide 49 and is fixed to the radius bar 47 by means of the set screw therein. The set screw 64 in the adjustable clamp 61 is now loosened and the rod 60 is moved axially through the clamp until the friction wheel 57 is positioned in a plane at right angles to a radius from the pin 50. The set screw 64 is now tightened, thereby fixing the rod 60 in the adjustable clamp 61. The support S, and with it the radius bar 47, is next moved with respect to the slide in such manner as to separate the stop 55 from the slide 49 by a distance equal to the radial distance between the circumference of the final cut and the point X where the cut is to be started. When the elements of the machine are so disposed, the friction wheel 57 will toe out or assume the position which is illustrated in Fig. 8, with the axis of the wheel 57 forming an acute angle with respect to a radius drawn from the pin 50. The motor 24 is now started, turning the shaft 39 and moving the support S with respect to the table T, the entire support moving about the centering pin 50 in a clockwise direction as viewed from above. The blowpipe necessarily follows the same path. Movement of the friction wheel 57 over the table T pulls the radius bar 47 and with it the support S and the blowpipe P away from the center of rotation, thereby separating the shaft 46 and the pin 50 a predetermined amount, determined by the stop 55 coming in contact with the end of the slide 49. As the stop 55 and the slide 49 approach one another, the pivotal rod 60 turns the horizontal rod 59 about its vertical pivot until the friction wheel 57 reaches a position wherein the axis is radial with respect to the path of travel. Thereafter, there is no sliding between the radius bar and the slide, and a true circle is cut in the workpiece.

A similar setting is made when it is desired to cut from the workpiece a circular part as the final product. In this case, the cut is started beyond the circumference of the final cut, as illustrated in Fig. 6. Accordingly, the pin 50 is inserted in the socket 51 in the table T, and the radius bar 47 is moved through the slide 49 until the axis of the shaft 46 is separated from the pin 50 by a distance equal to the radius of the circle to be cut. The stop 56 is now moved into contact with the slide 49 and is fixed upon the radius bar 47 in this position by means of the set screw therein. The set screw 64 in the adjustable clamp 61 is now loosened, and the rod 60 is moved through the clamp until the friction wheel 57 is positioned in a plane at right angles to the axis of the radius bar 47. The set screw 64 is now tightened to fix the rod 60 to the clamp 61 and through it to the slide 49. The radius bar 47, and with it the support S, is now moved away from the pin 50 until the slide 49 and the stop 56 are separated by a distance equal to the radial distance between an outside point Y in the workpiece where the cut is to be started and the circumference of the final cut. The friction wheel 57 will thereupon assume the position illustrated in Fig. 7, that is to say, a toed-in position. The motor 24 is now started, thereby turning the shaft 39 and moving the support S in a clockwise direction, as viewed from above, about the pin 50. The friction wheel 57 will clearly tend to move the radius bar 47 automatically toward the pin 50 and this motion will continue until the slide 49 and the stop 56 come into contact. Meanwhile, the rod 60 will act upon the horizontal rod 59 to turn the friction wheel 57 into a plane at right angles to the radius. The motion of the support S and of the blowpipe P which it carries will thereupon be circular; and a circular part will be cut from the workpiece, as illustrated in Fig. 6.

In the embodiment of the invention which is illustrated in Figs. 9, 10, and 11, the spur gear 43 is not locked against rotation, and the shafts 39 and 40 are both rotated by the motor 24. The traction rollers which are used when the machine is employed with a templet are removed. They are replaced by bevel gears which mesh with bevel gears 66 and 67 fixed respectively on either side of a vertical narrow traction wheel 68 which is carried on a horizontal pivot in the vertically adjustable sleeve 41. Thus operation of the motor 24 rotates the traction wheel 68.

A radius bar 47' is attached directly to the adjustable sleeve 41 of the apparatus by means of a split collar 69 fastened to the radius bar by means of a bracket 70 to which the collar is welded or otherwise attached. A clamping screw 71 serves to tighten the collar 69 firmly about the sleeve 41, thereby securing the radius bar 47' thereto. A slide 49' is mounted on the radius bar 47' extending beneath its flange and embracing the ends thereof; and the slide may be moved longitudinally of the bar as desired. A downwardly extending pin 50' is carried by the slide, being formed integrally therewith, or welded, or otherwise fastened thereto. The pin 50' makes pivotal engagement with a fixed socket 51 in the table T. Stops 55' and 56' are slidably held upon the flange of the radius bar 47' on either side of the slide 49'.

In the present embodiment, the motor and train of gears must necessarily turn upon the support S and accordingly turning of the motor and train of gears upon the support is not prevented. The strap 54, which is illustrated in Fig. 2, is therefore not employed.

In making a cut such as that illustrated in Fig. 5 with the embodiment illustrated in Figs. 9 to 11, inclusive, the wheel 68 and the pin 50' are separated by a distance equal to the radius of the circle which is to be cut. The stop 56' is then moved against the slide 49' and fastened in position. The wheel 68 is then moved toward the pin 50' by a distance equal to the radial distance between the point X and the circumference of the circle finally to be cut and the wheel 68 is turned into a toed-out position, that is to say, into the position which is illustrated in full lines in Fig. 11. The motor 24 is now started to turn the wheel 68 in a direction to give the apparatus clockwise rotation. Friction between the surface of the wheel and the table will draw the radius bar 47' and the support away from the socket 51 until the circumference is reached, whereupon the stop 56' will come into contact with the slide 49' and prevent further radial movement with respect to the socket and the pin 50'. It is noted that the wheel 68 may be freely steered because of the roller supporting mechanism, whereby the motor and train of gears are rotatably carried upon the support S, which mechanism is not restrained in this embodiment by the strap 54. However, when the wheel has been turned to toe out in order to perform the operation just described, the collar 69 is tightened about the vertically adjustable sleeve 41, and there is no further turning of the wheel 68 except for its rotation about its axle. Because the wheel 68 is a very thin wheel, however, there is a minimum resistance offered to movement about the socket 51 by its frictional contact with the table.

If a cut, such as that illustrated in Fig. 6, is to be made, the wheel is toed in, the stop 55' is brought into contact with the slide 49' when the wheel 68 and the pin 50' are spaced apart by a distance equal to the radius of the circle to be cut, and the wheel 68 and the pin 50' are then further separated by a distance equal to the distance of the point Y beyond the circumference of the final circle. The wheel 68, the support S, and the blowpipe P will then follow the path illustrated in Fig. 6.

From the foregoing, it will be apparent that the present invention provides means for guiding a shape-cutting machine in cutting circles of different diameters without the use of templets. It will be further apparent that the invention provides means which may be readily attached to and detached from a shape-cutting machine. Finally, it will be clear that the apparatus described is simple, durable, and inexpensive.

The forms of the invention here described and illustrated in the accompanying drawings are presented merely to indicate how the invention may be applied. Other forms differing in detail but not in principle from those here disclosed will, of course, suggest themselves to those skilled in the art.

I claim:

1. In a machine of the character described, the combination of a tool for operating on a workpiece, means for supporting said tool for universal movement in a plane, a shaft carried by said supporting means substantially perpendicular to the plane of movement of said tool, means for rotating said shaft, and means attached to said shaft for moving said tool in a circular path, said last-named means including a pin slidably mounted with respect thereto for pivotal engagement with a fixed socket, and a stop for limiting the sliding motion of said pin.

2. In a machine of the character described, the combination of a tool for operating on a workpiece, means for supporting said tool for universal movement in a plane, a shaft carried by said supporting means substantially perpendicular to the plane of movement of said tool, means for rotating said shaft, and means attached to said shaft for moving said tool in a circular path, said last-named means comprising a radius bar fixed to said shaft, a pin for pivotal engagement with a fixed socket and being slidably mounted on said bar, and a stop adjustably mounted on said bar for limiting the sliding motion of said pin.

3. In a machine of the character described, the combination of a tool for operating on a workpiece, means for supporting said tool for universal movement in a plane, a table providing a plane surface disposed beneath said supporting means, a shaft carried by said supporting means substantially perpendicular to the plane of movement of said tool, means for rotating said shaft mounted on said supporting means, and means attached to said shaft for moving said tool in a circular path, said last-named means comprising a radius bar fixed to said shaft, a pin slidably mounted on said bar for pivotal engagement with said table, a stop adjustably mounted on said bar for limiting the sliding motion of said pin, and a friction wheel carried by said bar on the opposite side of said shaft from that on which said pin is carried, said friction wheel being positioned to travel over the surface of said table and serving to guide said pin in the direction of its sliding motion on said bar.

4. In a machine of the character described, the combination of a tool for operating on a workpiece, means for supporting said tool for universal movement in a plane, a pair of shafts carried by said supporting means substantially perpendicular to the plane of movement of said tool, means for rotating said shafts, means for locking one of said shafts against rotation, a reducing gear mechanism operated by the unlocked shaft, and means attached to said reducing gear mechanism for moving said tool in a circular path, said last-named means including a pin for pivotal engagement with a fixed socket.

5. In a machine of the character described, the combination of a tool for operating on a workpiece, means for supporting said tool for universal movement in a plane, a pair of shafts carried by said supporting means substantially perpendicular to the plane of movement of said tool, means for rotating said shafts in opposite directions, bevel gears on the ends of said shafts, a sleeve surrounding said shafts, and means attached to said sleeve for moving said tool in a circular path, said means comprising a vertical traction wheel journaled in said sleeve and driven by said bevel gears for rolling contact with a table, a radius bar fixed to said sleeve, and a pin slidably mounted on said bar for pivotal engagement with the table.

6. In a machine of the character described, the combination of a tool for operating on a workpiece, means for supporting said tool for universal movement in a plane, a pair of shafts carried by said supporting means substantially perpendicular to the plane of movement of said tool, means for rotating said shafts in opposite directions, bevel gears on the ends of said shafts, a sleeve surrounding said shafts, and means attached to said sleeve for moving said tool in a circular path, said means comprising a vertical traction wheel journaled in said sleeve and driven by said bevel gears for rolling contact with a table, a radius bar fixed to said sleeve, means for adjusting the angle between said wheel and said bar, a pin slidably mounted on said bar for pivotal engagement with a fixed socket in the table, and an adjustable stop on said bar for limiting the extent to which said pin may slide on said bar.

7. For attachment to the vertical rotatable shaft of a shape-cutting machine, a radius bar, a slide mounted on said radius bar, a downwardly extending pin carried by said slide for pivotal engagement with a fixed socket in a table, and a stop on said bar for limiting the extent to which said slide may move on said bar.

8. For attachment to the vertical rotatable shaft of a shape-cutting machine, a radius bar, a slide mounted on said radius bar, a downwardly extending centering pin carried by said slide, and stops on said bar for limiting the extent to which said slide may move on said bar in either direction.

9. For attachment to the vertical rotatable shaft of a shape-cutting machine, a radius bar, a slide mounted on said radius bar on one side of its point of attachment to the shaft, a downwardly extending pin carried by said slide, and stops on said bar for limiting the extent to which said slide may move on said bar, in combination with a friction wheel mounted on said bar for rolling contact with the table, said wheel having its axle angularly movable about a vertical pivot.

10. In an apparatus for use in cutting circles with a shape-cutting machine provided with a carriage movable universally in a plane and having a pair of driving shafts rotating in opposite directions with a differential therebetween, the combination of means for locking one driving shaft against rotation, and means operated by the unlocked driving shaft for moving the carriage in a circle, said last-named means comprising a radius bar rotatable with respect to the carriage, and a pin carried by said radius bar for pivotal engagement with a fixed socket.

11. A shape-cutting machine for operation on rails above a table, said machine comprising a wheeled carriage for forward and backward movement on the rails above the table, transverse rails carried by said carriage extending at right angles to the rails upon which said carriage moves, a second wheeled carriage supported for transverse movement in either direction on the rails of said first carriage, a tool carried by said second carriage, a motor carried by said second carriage, and a shaft driven from said motor extending downwardly from said second carriage toward the table, in combination with a substantially horizontal radius rod attached to the lower end of said shaft, a pin slidably mounted on said radius rod for pivotal engagement with a socket in the table, and means causing said pin to slide with respect to said rod within predetermined limits when said rod is rotated.

12. A shape-cutting machine for operation on rails above a table, said machine comprising a wheeled carriage for forward and backward movement on the rails above the table, transverse rails carried by said carriage extending at right angles to the rails upon which said carriage moves, a second wheeled carriage supported for transverse movement in either direction on the rails of said first carriage, a tool carried by said second carriage, a motor carried by said second carriage, and a shaft driven from said motor extending downwardly from said second carriage toward the table, in combination with a substantially horizontal radius rod attached to the lower end of said shaft, a pin slidably mounted on said radius rod for engagement with a socket in the table, a stop adjustably mounted on said radius rod for limiting the sliding motion of said pin, and a friction wheel carried by said radius rod on the opposite side of said shaft from that on which said pin is carried, said friction wheel serving to urge said pin to slide with respect to said rod.

13. In an apparatus for cutting circles wherein a cutting tool is propelled in a circular path by motion imparted to said tool by a radius bar rotatable about a center, the combination comprising means for initially adjusting said radius bar and said tool in a position separated radially from the desired circular path; means for rotating said radius bar; means operative upon the rotation of said bar to shift the position of said bar and said tool radially onto the desired circular path; and means inhibiting further radial movement of said bar and tool when the circular path is reached.

14. In an apparatus wherein a carriage is movable about a predetermined circular path in response to the rotary movement of a radius bar about a centering pin, and wherein a tool is propelled in a similar path by said carriage, the combination comprising means for initially adjusting said radius bar to locate said tool at a point radially separated from the predetermined circular path; means operative upon rotation of said radius bar at the start of an operation to vary the effective radius of said radius bar to shift said tool radially onto the predetermined circular path; and means for inhibiting further variation in the effective radius of said bar when said tool reaches a position on said predetermined circular path.

15. Combination as claimed in claim 14 wherein said means for varying the effective radius of said bar comprises a wheel secured to said bar in rolling engagement with a table, said wheel being initially positioned so that its axis forms an acute angle with a radius extending from said centering pin to said wheel.

16. Combination as claimed in claim 14 wherein said means for varying the effective radius of said bar comprises a wheel secured to said bar in rolling engagement with a table, said wheel being initially positioned so that its axis forms an acute angle with a radius extending from said centering pin to said wheel, said combination including means for shifting the axis of said wheel as the effective radius of said bar changes, whereby said axis is substantially radially disposed with respect to the path of travel when said tool reaches said predetermined circular path.

17. Apparatus for following circular paths comprising a radius bar; a centering pin carried by said bar; blowpipe supporting means secured to said radius bar for movement in a curved path about said pin; a blowpipe secured to said means; power driven means for rotating said bar; and means operable by the rotation of said bar for altering the effective radius of said bar by a predetermined amount.

18. Apparatus for guiding a blowpipe about circular paths, comprising a radius bar; a center pin supporting member adjacent to said bar; a center pin projecting from said member and adapted to pivot said bar about a predetermined center point; power driven means for rotating said bar about said pin as a center; a blowpipe guided by said bar as said bar rotates about said pin; shifting means operatively connected between said bar and said member for providing a predetermined amount of relative movement between said bar and said member, said shifting means thereby being adapted to increase and decrease by predetermined increments the effective radius of said bar; and means for inhibiting further movement of said shifting means when said shifting means has provided said predetermined amount of relative movement.

ROBERT L. WAGNER.